United States Patent [19]
Iwasa

[11] Patent Number: 4,967,056
[45] Date of Patent: Oct. 30, 1990

[54] VEHICLE WINDOW HEATING APPARATUS

[75] Inventor: Yoshio Iwasa, Nagareyama, Japan

[73] Assignee: Nissan Motor Co., Ltd., Yokohama, Japan

[21] Appl. No.: 313,425

[22] Filed: Feb. 22, 1989

[30] Foreign Application Priority Data

Mar. 30, 1988 [JP] Japan .................................. 63-74726

[51] Int. Cl.$^5$ ................................................ B60L 1/00
[52] U.S. Cl. ..................................... 219/203; 219/522; 307/10.1
[58] Field of Search ............... 219/203, 279, 522, 547; 307/10.1

[56] References Cited
U.S. PATENT DOCUMENTS 4,730,097  3/1988  Campbell et al. ..................... 219/203

FOREIGN PATENT DOCUMENTS 1483033  8/1977  United Kingdom .

Primary Examiner—C. L. Albritton
Attorney, Agent, or Firm—Pennie & Edmonds

[57] ABSTRACT

A vehicle window heating apparatus includes a heating element provided for heating a vehicle window when connected to a generator. The generator has a field winding fed from a voltage regulator connected to a vehicle battery. The apparatus also includes a circuit for connecting the generator selectively to one of the voltage regulator and the heating element. The circuit is responsive to a signal indicative of a demand for a window de-icing operation for connecting the generator to the heating element while disconnecting it from the voltage regulator and the vehicle battery upon the occurrence of three conditions of (a) the vehicle transmission being in neutral or park, (b) the engine being idling, and (c) the vehicle being at rest.

12 Claims, 5 Drawing Sheets

VEHICLE WINDOW HEATING APPARATUS

BACKGROUND OF THE INVENTION

This invention relates to an apparatus for controlling the energization of electrically heated vehicle windows.

An example of such a vehicle window heating apparatus is disclosed in Japanese Patent Kokai No. 61-33735. The apparatus involves a heating element provided for de-icing the vehicle window. The heating element is powered by a generator which has a main output connected to charge a vehicle battery and a field winding fed from a voltage regulator. A control circuit is provided for connecting the generator main output to the heating element while disconnecting it from the vehicle battery and the voltage regulator so that the full generator output is delivered to energize the heating element for a limited period of time when a window de-icing operation is required. This is effective to ensure that the heating element is supplied with a large amount of power required for de-icing the vehicle window.

One disadvantage with such a conventional apparatus is that high-voltage power will be supplied to damage the heating element and shorten its service life when the window de-icing operation is required during vehicle running conditions. This is because the generator field winding is driven at a speed proportional to the engine speed, the heating element is supplied with a voltage determined by the engine speed during the window de-icing operation where the voltage regulator is disconnected from the generator main output. Another disadvantage is that the vehicle battery may die during vehicle running conditions since the vehicle battery is disconnected from the generator main output during the window de-icing operation.

SUMMARY OF THE INVENTION

It is a main object of the invention to provide an improved vehicle window heating apparatus which permits good window de-icing operations without the danger of damaging the heating element and causing the vehicle battery to die.

There is provided, in accordance with the invention, a vehicle window heating apparatus for use with an automotive vehicle including a vehicle battery, an internal combustion engine having a throttle valve, a transmission, a generator having an output winding and a field winding adapted to rotate with respect to the output winding synchronous with the engine, for generating an output voltage at its output terminal, and a voltage regulator connected to the vehicle battery for adjusting current from the battery to the field winding. The window heating apparatus comprises a heating element provided for heating a vehicle window when connected to the generator output terminal, and means for providing a demand signal indicative of a demand for heating the vehicle window. Sensing means are provided for deriving signals indicative of conditions of (a) the transmission being in neutral or park, (b) the engine being idling, and (c) the vehicle being at rest. The apparatus also comprises a control unit coupled to the sensing means. The control unit includes means responsive to the demand signal for providing a command signal upon the occurrence of the three conditions (a), (b) and (c). A circuit is connected to the control unit for connecting the generator output terminal selectively to one of the voltage regulator and the heating element. The circuit includes means responsive to the command signal for connecting the generator output terminal to the heating element while disconnecting the generator output terminal from the voltage regulator and the vehicle battery.

BRIEF DESCRIPTION OF THE DRAWINGS

This invention will be described in greater detail by reference to the following description taken in connection with the accompanying drawings, in which like reference numerals refer to the same parts, and wherein.

DETAILED DESCRIPTION OF THE INVENTION

Figure 1:
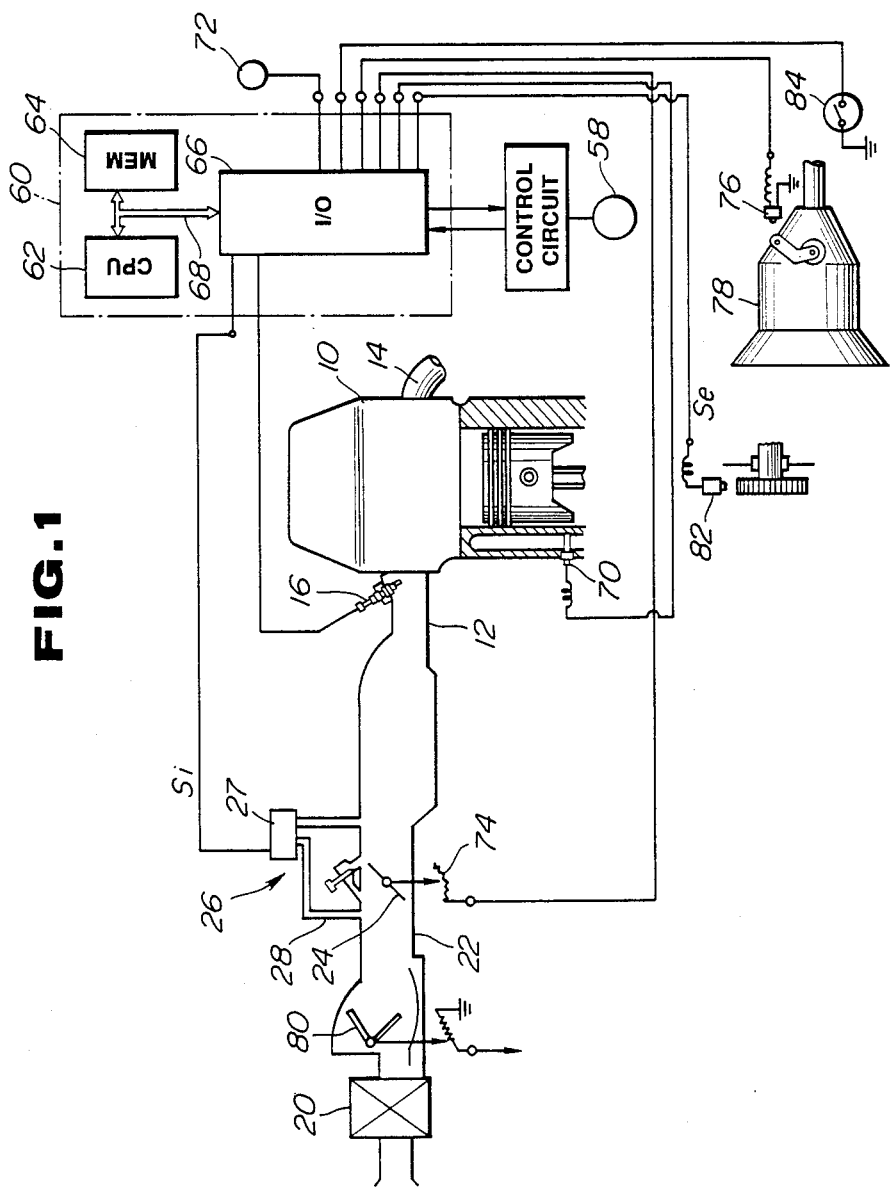
FIG. 1 is a schematic diagram showing one embodiment of a vehicle window heating apparatus made in accordance with the present invention.

With reference to the drawings, wherein like numerals refer to like parts in the several views, and in particular to FIG. 1, there is shown a schematic diagram of a vehicle window heating apparatus embodying the invention. An internal combustion engine, generally designated by the numeral 10, for an automotive vehicle includes an intake manifold 12 and exhaust manifold 14. A fuel injector 16 opens to inject fuel into the intake manifold 12 when it is energized by an electrical current. The length of the electrical pulse, that is, the pulse width, applied to the fuel injector 12 determines the length of time the fuel injector opens and, thus, determines the amount of fuel injected into the intake manifold 12. Air to the engine 10 is supplied through an air cleaner 20 into an induction passage 22. The amount of air permitted to enter the engine through the intake manifold 12 is controlled by a butterfly throttle valve 24 situated within the induction passage 22. The throttle valve 24 is connected by a mechanical linkage to an accelerator pedal (not shown) manually controlled by the operator of the vehicle.

The auxiliary air control device 26 includes a flow control solenoid valve 27 provided to control the amount of air into the induction passage 22 through an auxiliary passage 28 bypassing the throttle valve 24. The flow control valve 27 opens to permit air flow through the auxiliary passage 28 when it is energized by the present of electrical current Si. The duty ratio of the electrical current Si applied to the flow control valve 27 determines the amount of air flowing through the auxiliary passage 28. The auxiliary air control device 26 controls the speed of the engine when the amount of air flowing through the auxiliary passage 28 is varied. It is to be noted that the flow control solenoid valve 27 may be taken in the form of a butterfly valve driven by a stepper motor as well known in the art.

Figure 2:
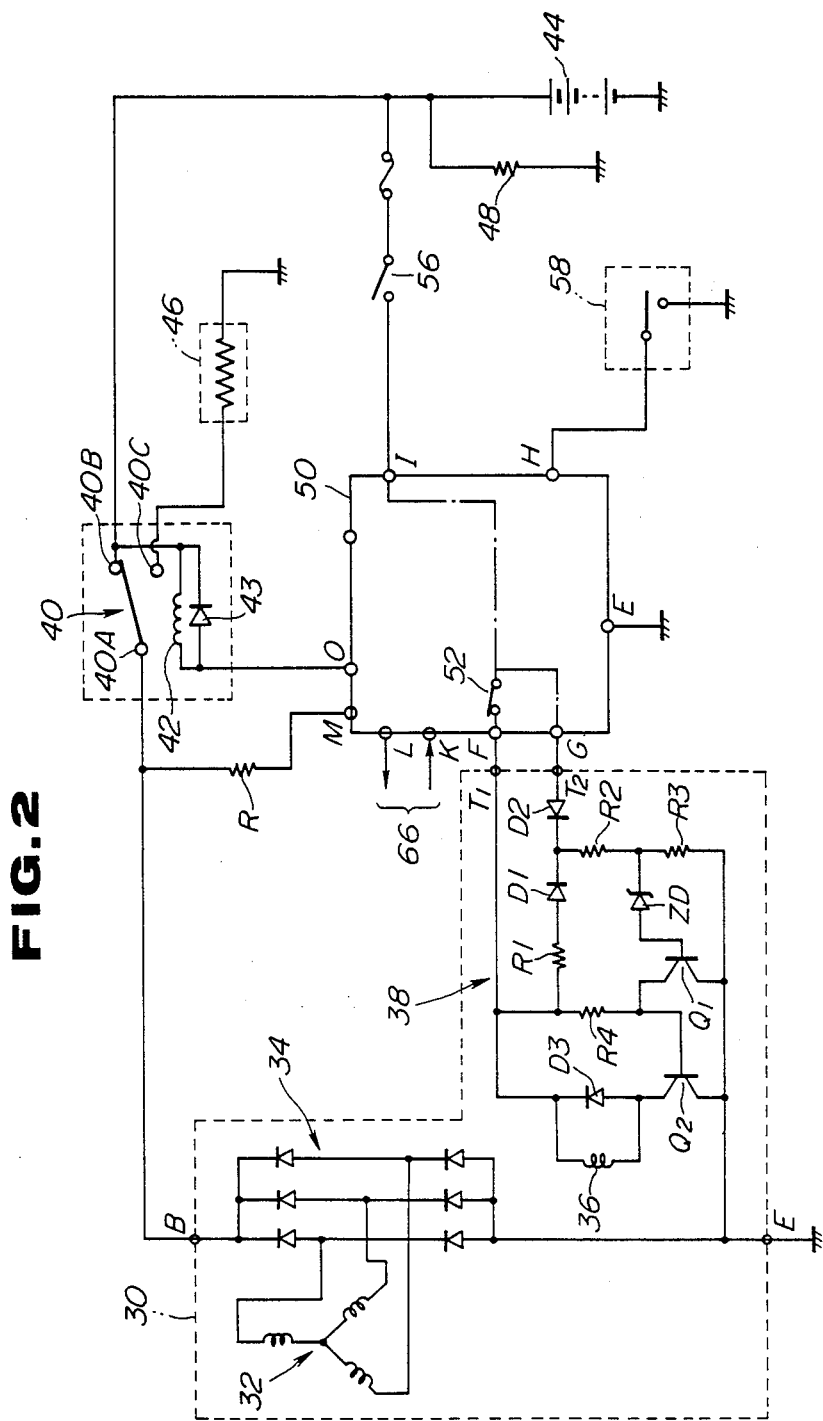
FIG. 2 is a circuit diagram showing electrical connections to the de-ice control circuit.

Referring to FIG. 2, an alternating current generator, which is generally designated by the numeral 30, includes a three-phase Y-connected output winding 32. The output winding 32 may be would on a suitable stator core as is well known to those skilled in the art. The output winding 32 is connected to an output terminal B through a three-phase diode full-wave rectifier bridge 34 which applies a direct voltage to the output terminal B. The alternator 30 also includes a field winding 36 suitably wound on the rotor of the alternator 30. The field winding 36 controls the output voltage of the alternator 30 when the field current in the field winding 36 is varied. The field current supplied to the field winding 36 is adjusted by a conventional voltage regulator 38. The voltage regulator 38, which is connected to a vehicle battery 44, senses the output voltage of the alternator 30 and controls current to the field winding 36 to maintain the alternator output voltage at a predetermined value.

The voltage regulator 38 includes first and second terminals T1 and T2. The first terminal T1 is connected through a resistor R1 to the anode of a diode D1 having its cathode connected to a junction J1. The second terminal T2 is connected to the anode of a diode D2 having its cathode connected to the junction J1. A pair of resistors R2 and R3 are connected in series between the junction J1 and ground to form a voltage divider with the node N1 being the junction of the resistors R2 and R3 for sensing the DC voltage at the alternator output terminal B when the alternator output terminal B is connected to the voltage regulator. The node N1 of the voltage divider is connected to the cathode of a Zener diode ZD which has its anode connected to an inverter. The inverter shown comprises a transistor Q1 having its base connected to the cathode of Zener diode ZD. The Zener diode ZD sets a reference voltage, for example, 12 volts. The collector of the transistor Q1 is connected through a resistor R4 to the first terminal T1. The emitter of transistor Q1 is connected to ground. The inverter is driven by the current flowing through the Zener diode ZD. The field winding 36 is connected at one end to the first terminal T1 and at the other end thereof to ground through a driver. The driver shown includes a transistor Q2 which is a Darlington configuration. The transistor Q2 base is connected to the collector of the transistor Q1. The collector of the transistor Q2 is connected to the other end of the field winding 36. The emitter of the transistor Q2 is connected to ground. A protective diode D3 is connected in parallel with the field winding 36 to provides protection of the field winding 36 from surge voltage which may be produced across the field winding 36 when the transistor Q2 is turned off.

The alternator output terminal B is connected to a two-position switch 40 which is controlled by a relay coil 42 connected in parallel with a protective diode 43. The relay controlled switch 40 has contacts 40A, 40B and 40C. When the relay coil 42 is de-energized, the relay controlled switch 40 is at a first position engaging its contact 40A with its fixed contact 40B to connect the alternator output terminal B to the vehicle battery 44. When the relay coil 42 is energized, the relay controlled switch 40 shifts from the first position to a second position engaging its contact 40A with its fixed contact 40C to connect the alternator output terminal B to an electrical resistance heating element 46 provided for heating vehicle windows. The heating element 46 may be in the form of conductive metal particles deposited in the window glass. A load 48 is shown as driven by the vehicle battery 44.

The numeral 50 designates a de-ice control circuit having terminals E, F, G, H, I, K, L, M and O. The terminal E is connected to ground. The terminal F is connected to the first terminal T1 of the voltage regulator 38. The terminal G is connected to the second terminal T2 of the voltage regulator 38. The terminal I is connected through a manually operable key switch 56 to the vehicle battery 44. The control circuit 50 is powered by the vehicle battery 44 when the key switch 56 is closed. The terminal I is directly connected to the terminal G and also through a normally closed switch 52 to the terminal F. The control circuit 50 includes an appropriate protective circuit which opens the switch 52 to interrupt current to the field winding 36, causing the alternator 30 to stop voltage generation only when the alternator 30 generates a voltage exceeding a predetermined upper limit, for example, 75 volts. For this purpose, the terminal M is connected through a resistor R to the alternator output terminal B. The terminal H is connected to a manually operable de-ice switch 58. The terminals K and L are connected to a control unit 60 (FIG. 1) for communication therewith. The control circuit 50 includes a circuit for producing a demand signal at the terminal L when the de-ice switch 58 is closed. The terminal O is connected to the relay coil 42. The control circuit 50 includes a circuit responsive to a command signal applied at its terminal K from the control unit 60 for making a connection between the terminals O and E to connect the relay coil 42 across the vehicle battery 44. When the relay coil 42 is energized, the relay controlled switch 40 shifts from its first position to its second position. At this second position, the relay controlled switch 40 disconnects the alternator output terminal B from the vehicle battery 44 and the voltage regulator 38 while connecting the alternator output terminal B to the heating element 46. As a result, the heating element 46, which is supplied with a DC voltage having a magnitude corresponding to the speed of rotation of the engine, de-ices the vehicle window.

Returning to FIG. 1, the control unit 60 controls the fuel injector 16, the flow control valve 27, and the de-ice control circuit 50 based upon various conditions of the engine that are sensed during its operation. These sensed conditions include cylinder-head coolant temperature, ambient temperature, vehicle-compartment temperature, throttle position, transmission gear position, intake air flow, engine speed, and vehicle speed. Thus, a cylinder-head coolant temperature sensor 70, ambient or vehicle-compartment sensor 72, a throttle position sensor 74, a transmission-gear position sensor 76, an air flow meter 80, an engine speed sensor 82, and a vehicle speed sensor 84 are connected to the control unit 60.

The cylinder-head coolant temperature sensor 70 is mounted in the engine cooling system and comprises a thermistor connected in an electrical circuit that produces a DC voltage having a variable level proportional to coolant temperature. The ambient or vehicle-compartment temperature sensor 72 produces a voltage signal proportional to the sensed temperature. The throttle-valve position sensor 74 is a potentiometer electrically connected in a voltage divider circuit for supplying a DC voltage proportional to throttle-valve position. In this case, the throttle-valve position sensor 74 may be a throttle switch which is closed to produce a signal indicating that the engine is idling when the throttle position is at an angle less than a fixed value, for example, 6° open. The transmission-gear position sensor 76, which is associated with the vehicle transmission 78, generates a signal whenever the transmission is in neutral or park. The air flow meter 80 is responsive to the air flow through the induction passage 22 to produce a signal proportional thereto. The engine speed sensor 82 produces a series of electrical pulses at a predetermined number of degrees of the engine crankshaft. The vehicle speed sensor 84 may be a switch which is closed to produce a signal indicating that the vehicle is at rest when the vehicle is running at a speed less than a predetermined value, for example, 5 km/h indicating that the vehicle is at rest.

The control unit 60 includes a digital computer which includes a central processing unit (CPU) 62, a memory unit (MEM) 64, and an input/output control unit (I/O) 66. The central processing unit 62 communicates with the rest of the computer via data bus 68. The input/output control unit 66 includes an analog multiplexer, an analog-to-digital converter, a crankshaft position counter, a timer, a fuel injection control circuit, and a valve control circuit. The analog-to-digital converter receives analog signals to the multiplexer from the various sensors and it converts the received analog signals into corresponding digital signals for application to the central processing unit 62. The A to D conversion process is initiated on command from the central processing unit 62 which selects the input channel to be converted. The crankshaft position counter counts the electrical pulses from the engine speed sensor 82. The resulting count is used to calculate the speed of rotation of the engine. The timer starts counting clock pulses when the de-ice switch 58 (FIG. 2) is closed. The resulting count indicates the length of time the de-ice switch is closed. The memory unit 64 includes a random access memory (RAM) and a read only memory (ROM). The read only memory contains the program for operating the central processing unit 62 and further contains appropriate data in look-up tables used in calculating appropriate values for fuel-injection pulse-width and other engine control variables. Control words specifying a desired fuel-injection pulse-width are periodically transferred by the central processing unit 62 to the fuel-injection control circuit which converts it into a control signal to the fuel injector 24.

The control unit 60 is responsive to a demand signal to temporarily stop execution of the program control sequence (background job) and to start executing an interrupt routine for controlling the window de-icing operation. The control unit 60 provides a command signal to the de-ice control circuit 50 which thereby causes the relay controlled switch 40 to connect the alternator output terminal B to the heating element 46 while disconnecting the alternator output terminal from the voltage regulator 38 and the vehicle battery 44 upon the occurrence of specified conditions as described later in greater detail. During the execution of the interrupt routine, the digital computer calculates appropriate values for valve-control-signal duty-ratio. Control words specifying a desired valve-control-signal duty-ratio are periodically transferred by the central processing unit 62 to the valve control circuit which converts it into a control signal Si having a duty ratio calculated by the computer. The control signal is applied to the flow control valve 27 for controlling the rate of flow through the auxiliary passage 28 so as to control the speed of rotation of the engine.

Figure 3A:
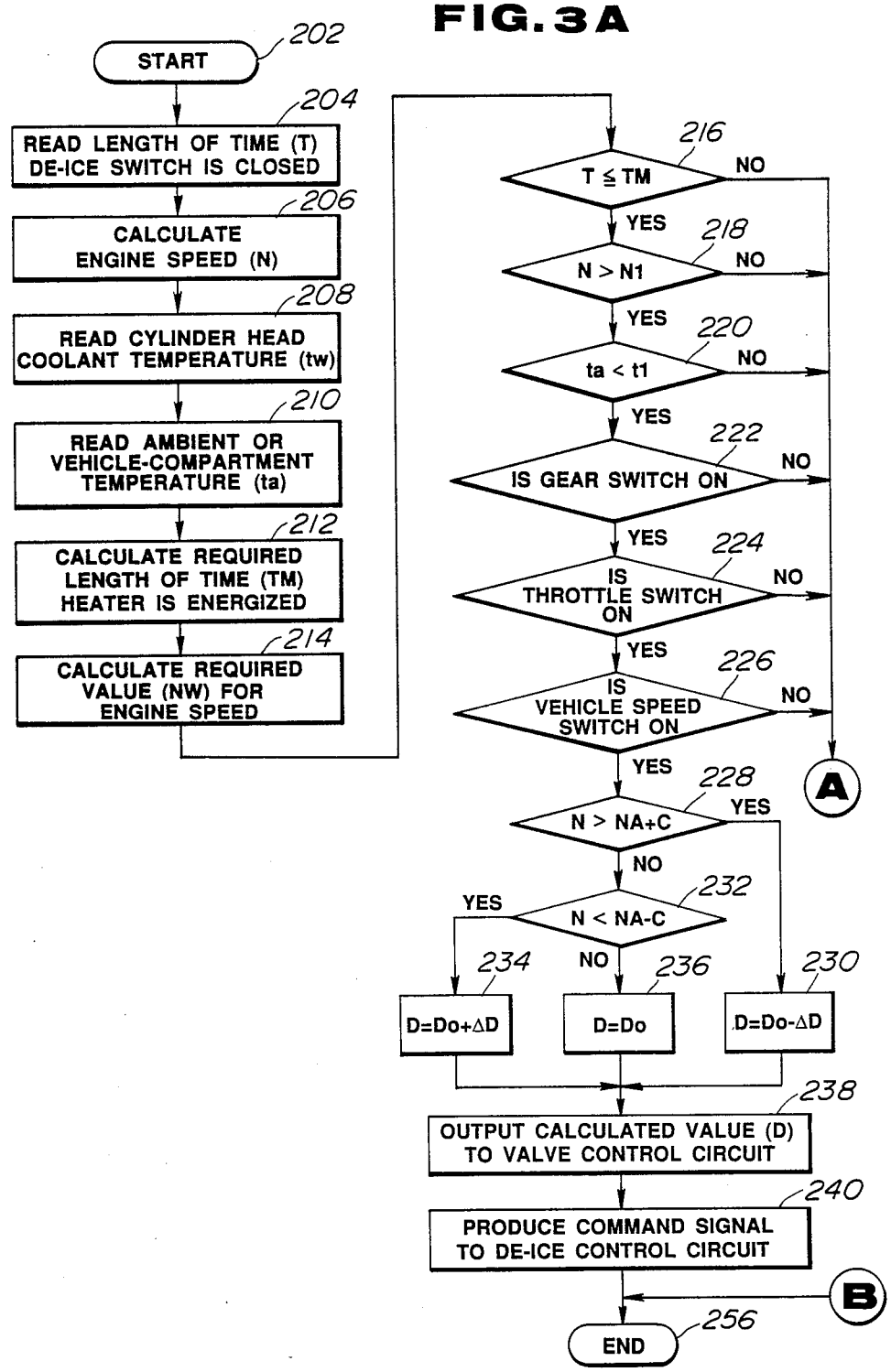
FIGS. 3A and 3B shows a flow diagram illustrating the programming of the digital computer as it is used to control the window de-icing operation.
Figure 3B:
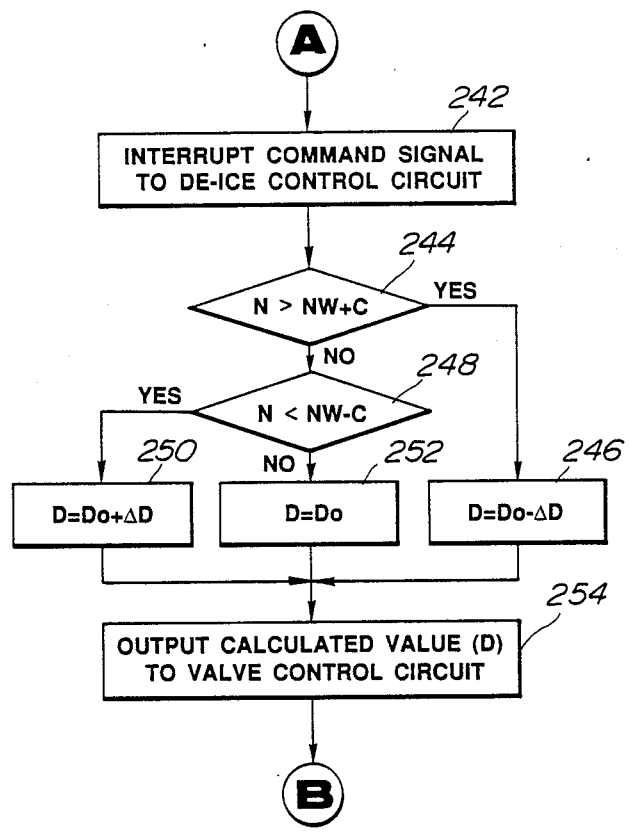

FIGS. 3A and 3B show a flow diagram illustrating the programming of the digital computer 60 as it is used to control the de-icing operation. This program is executed only when the de-ice switch 58 is closed and the de-ice control circuit 50 produces a demand signal to the control unit 60. The computer program is entered at point 202 at uniform time intervals, for example, 20 microseconds. At point 204 in the program, the central processing unit 62 reads the timer. The timer starts counting clock pulses upon closure of the de-ice switch 58 and has a count indicating the length of time (T) the de-ice switch 58 is at its closed position. At point 206 in the program, engine angular velocity, or speed, is calculated from the engine speed signal Se. Following this, the various inputs to the analog multiplexer are, one by one, converted by the analog-to-digital converter into digital form and read into the computer memory 64 via the data bus 68. Thus, at point 208 in the program, the cylinder-head coolant-temperature signal is converted to digital form and read into the computer memory. Similarly, at point 210, the ambient-temperature signal is converted to digital form and read into the computer memory.

Figure 4:
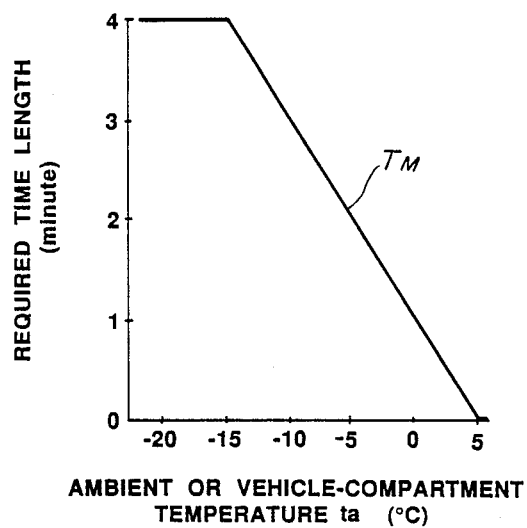
FIG. 4 is a graph of required time length versus ambient temperature.
Figure 5:
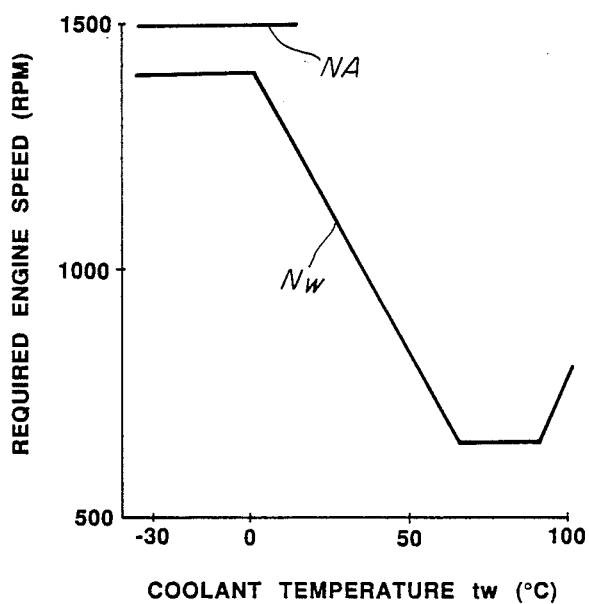
FIG. 5 is a graph of required engine speed versus cylinder-head coolant temperature.

At point 212 in the program, the required length of time (TM) the heating element 46 is to be energized is calculated by the central processing unit 62 from a relationship stored in the computer memory 64. This relationship is shown in FIG. 4 and it specifies this time length (TM) as a function of ambient or vehicle-compartment temperature (ta). It can be seen from FIG. 4 that the lower the ambient or vehicle-compartment temperature, the longer the length of time (TM) required for the heating element 46 to be energized. At the point 214, the central processing unit 62 calculates a required value (NW) for engine speed from a relationship which specifies this value (NW) as a function of cylinder-head coolant temperature (tw), as shown in FIG. 5.

At the point 216 in the program, a determination is made as to whether or not the length of time (T) that the de-ice switch 58 is closed is equal to or less than the required value (TM). If the answer to this question is "no", then the program proceeds to the point 242. Otherwise, the program proceeds to another determination step at the point 218. This determines whether or not the engine speed (N) is greater than a predetermined value (N1), for example, 600 rpm., below which the engine may stall when the heating element 46 is energized. If the answer to this question is "no", then the program proceeds to the point 242. If there is no risk of engine stall, the program proceeds from the point 218 to the point 220.

At the point 220 in the program, a determination is made as to whether or not the ambient or vehicle-compartment temperature (ta) is less than a predetermined value, for example, 5° C. If the answer is "no" this indicates that the window is not iced and the program proceeds to the point 242. Otherwise, the program proceeds to point 22 which determines whether or not the transmission gear switch 76 is ON. If the answer to this question is "yes", then it means that the transmission is in neutral or park and the program proceeds to the point 222. Otherwise, the program proceeds to the point 242. The determination step at the point 222 is effective to avoid unexpected vehicle speed increases during the window de-icing operation.

At point 224 in the program, a determination is made as to whether or not the throttle switch 74 is on. If the answer to this question is "no", then the program proceeds to point 242. If the throttle switch is "on", then it means that the engine is idling and the program proceeds to the point 226. The determination step at the point 224 prevents the heating element 46 from being subjected to high-voltage power produced when the engine is raced.

At point 226 in the program, a determination is made as to whether or not the vehicle speed switch 84 is ON. If the answer to this question is "no", then the program proceeds to point 242. If the vehicle speed switch 84 is ON, then it means that the vehicle is at rest and the program proceeds to the point 228.

At point 228 in the program, a determination is made as to whether or not the engine speed (N) is greater than a required value (NA) plus a predetermined value (C), for example, 25 rpm. As can be seen from FIG. 5, the required value (NA) is a constant value greater than the reference value (NW) over the whole range of the cylinder-head coolant temperature (tw). If the answer to this question is "yes", then the program proceeds to point 230 where the central processing unit 62 calculates a new value (D) for the duty ratio of the control signal Si applied to the flow control valve 27 by subtracting a predetermined value ($\Delta D$) from the last duty ratio value (Do) so as to decrease the engine speed. The predetermined value ($\Delta D$) may be selected to decrease the control signal duty ratio by one percent. The calculated new value (D) is stored into the computer memory 64. Otherwise, the program proceeds from point 228 to another determination step at point 232. This determination is as to whether or not the engine speed (N) is less than the required value (NA) minus the predetermined value (C). If the answer to this question is "yes", then the program proceeds to point 234 where the central processing unit 62 calculates a new value (D) for the duty ratio of the control signal Si applied to the flow control valve 27 by adding the predetermined value ($\Delta D$) to the last duty ratio value (Do) so as to increase the engine speed. The calculated new value (D) is stored into the computer memory 64. If $NA - C \leq N \leq NA + C$, then the program proceeds from point 232 to the point 236 where the central processing unit 62 calculates a new value (D) for the duty ratio of the control signal Si applied to the flow control valve 27, the new value (D) being equal to the last duty ratio value (Do). The calculated value (D) is stored into the computer memory 64. It is to be noted that these steps at the point 228 to 236 are intended to keep the engine speed within a range defined by a lower limit (NA $-$ C) and an upper limit (NA$+$C).

At point 238 in the program, the calculated value (D) is transferred via the data bus 68 to the valve control circuit. The valve control circuit then sets the duty ratio of the control signal Si applied to the flow control valve 27 according to the calculated value (D) and causes the flow control valve 27 to make a change in the rate of flow through the auxiliary passage 28 if this is required. At point 240, the central processing unit 62 causes the input/output control unit 66 to produces a command signal to the de-ice control circuit 50 which thereby connects the relay coil 42 across the vehicle battery 44. The relay controlled switch 40 then shifts from its first position to its second position connecting the alternator output terminal B to the heating element 46 and disconnecting the alternator output terminal B from the voltage regulator 38 and the vehicle battery 44. Following this, the program proceeds to the end point 256.

Thus, the apparatus permits a window de-icing operation upon the occurrence of at least three conditions of (a) the transmission being in neutral or park, (b) the engine being idling, and (c) the vehicle being at rest. During the window de-icing operation, the engine speed is maintained at a great value (NA), for example, 1500 rpm., permitting the generator to produce a large amount of power sufficient for de-icing the vehicle window. The predetermined value (C) defines a dead zone which is effective to prevent hunting in controlling the engine speed.

It is to be noted that the command signal is interrupted to cause the relay controlled switch 40 to shift to its first position a time (TM) after the de-ice switch 58 is closed.

At the point 242 in the program, the central processing unit 62 causes the input/output control unit 66 to interrupt the command signal to the de-ice control circuit 50 which thereby disconnects the relay coil 42 from the vehicle battery 44. The relay controlled switch 40 then shifts to its first position connecting the alternator output terminal B to the voltage regulator 38 and the vehicle battery 44 and disconnecting the alternator output terminal B from the heating element 46.

At point 244 in the program, a determination is made as to whether or not the engine speed (N) is greater than the required value (NW) plus the predetermined value (C). If the answer is "yes", then the program proceeds to the point 246 where the central processing unit 62 calculates a new value (D) for the duty ratio of the control signal Si applied to the flow control valve 27 by subtracting a predetermined value ($\Delta D$) from the last duty ratio value (Do) so as to decrease the engine speed. The predetermined value ($\Delta D$) may be selected to decrease the control signal duty ratio by one percent. The calculated new value (D) is stored into the computer memory 64. Otherwise, the program proceeds from the point 244 to another determination step at point 248. This determination is as to whether or not the engine speed (N) is less than the required value (NW) minus the predetermined value (C). If the answer is "yes", then the program proceeds to point 250 where the central processing unit 62 calculates a new value (D) for the duty ratio of the control signal Si applied to the flow control valve 27 by adding the predetermined value ($\Delta D$) to the last duty ratio value (Do) so as to increase the engine speed. The calculated new value (D) is stored into the computer memory 64. If $NW - C \leq N \leq NW + C$, then the program proceeds from the point 248 to point 252 where the central processing unit 62 calculates a new value (D) for the duty ratio of the control signal Si applied to the flow control valve 27, the new value (D) being equal to the last duty ratio value (Do). The calculated value (D) is stored into the computer memory 64. It is to be noted that these steps at the points 244 to 252 are intended to keep the engine speed within a range defined by a lower limit (NW $-$ C) and an upper limit (NW$+$C).

At point 254 in the program, the calculated value (D) is transferred via the data bus 68 to the valve control circuit. The valve control circuit then sets the duty ratio of the control signal Si applied to the flow control valve 27 according to the calculated value (D) and causes the flow control valve 27 to make a change in the rate of flow through the auxiliary passage 28 if this is required. Following this, the program proceeds to the end point 256.

Thus, when the window de-icing operation starts during an engine warming-up operation, the the engine worming-up operation is resumed a time TM after the de-ice switch 58 is closed. For this purpose, the apparatus includes a circuit for sensing a requirement for engine warming-up operation. This circuit may include means for sensing the engine warming-up requirement when the cylinder-head coolant temperature is less than a predetermined value, for example, 40° C. During the engine warming-up operation, the engine speed is controlled to an appropriate value (NW) dependent on cylinder-head coolant temperature (tw).

What is claimed is:

1. An apparatus for use with an automotive vehicle, said vehicle including a window, a vehicle battery, an internal combustion engine having a throttle valve, a transmission having selectable modes including at least neutral, park and drive, means for generating a DC voltage, said means including a voltage output terminal, an output winding and a field winding which rotates with respect to said output winding, and a voltage regulator for regulating current from said battery to said field winding, said apparatus comprising:

a resistive heating element which when connected to said voltage output terminal heats said window;

means for generating a demand signal indicative of a necessity for heating said vehicle window;

sensing means whose output signals indicate conditions of (a) said transmission being in one of either neutral and park, (b) said engine idling, and (c) said vehicle being at rest;

a control means for generating a command signal in response to said demand signal and said sensing means output signals;

a control circuit which in response to said command signal selects one of (a) overriding said voltage regulator so as to provide an unregulated current path from said battery to said field winding such that generator output voltage is proportional to relative rotational velocity between said field winding and said output winding, connects said output voltage to said heating element and disconnects said output voltage from said battery and (b) enabling said voltage regulator such that said voltage regulator regulates current from said battery to said field winding so as to maintain said voltage output at a predetermined value, connects said voltage output to said battery, and disconnect said voltage output from said heating element.

2. The apparatus as claimed in claim 1, wherein said sensing means include means for sensing the condition of (b) the engine being idling when the throttle valve being positioned at an angle less than a predetermined value, and means for sensing the condition of (c) the vehicle being at rest when the vehicle being running at a speed less than a predetermined value.

3. The apparatus as claimed in claim 1, wherein said control means includes a source for deriving an inhibitory signal indicative of said engine being at a speed less than a predetermined value, and means responsive to said inhibitory signal for interrupting said command signal to the circuit so as to avoid engine stall.

4. The apparatus as claimed in claim 1, wherein said control means includes a sensor sensitive to ambient temperatures for producing a signal indicative of a sensed ambient temperature, means coupled to the sensor for providing an inhibitory signal when the sensed ambient temperature is greater than a predetermined value, and means responsive to said inhibitory signal for interrupting said command signal to said control circuit.

5. The apparatus as claimed in claim 1, wherein said control means unit includes a sensor sensitive to vehicle compartment temperatures for producing a signal indicative of a sensed vehicle compartment temperature, means coupled to said sensor for producing an inhibitory signal indicative of the sensed vehicle compartment temperature being greater than a predetermined value, and means responsive to inhibitory signal for interrupting said command signal to the circuit.

6. The apparatus as claimed in claim 1, wherein said control means includes means for interrupting said command signal to said control circuit a time after the occurrence of said demand signal.

7. The apparatus as claimed in claim 6, wherein said control means includes means for determining the time as a function of ambient temperature.

8. The apparatus as claimed in claim 6, wherein said control means includes means for determining the time as a function of vehicle-compartment temperature.

9. The apparatus as claimed in claim 1, wherein said control means includes means for controlling said engine at a predetermined speed in the presence of said command signal.

10. The apparatus as claimed in claim 9, wherein said control circuit including means for interrupting said command signal to the circuit a time after the occurrence of said, demand signal.

11. The apparatus as claimed in claim 10, wherein said control unit includes means for controlling said engine at a variable speed dependent on cylinder-head coolant temperature when said command signal is interrupted.

12. The apparatus as claimed in claim 11, wherein said control means includes means for controlling the engine at a speed increasing as the cylinder-head coolant temperature decreases.

* * * * *